United States Patent
Jagodzinski

(10) Patent No.: US 7,815,546 B2
(45) Date of Patent: Oct. 19, 2010

(54) METHOD AND DEVICE FOR ACTIVATING AN ELECTRIC PARKING BRAKE

(75) Inventor: Volker Jagodzinski, Hannover (DE)

(73) Assignee: Volkswagen AG, Wolfsburg (DE)

( * ) Notice: Subject to any disclaimer, the term of this patent is extended or adjusted under 35 U.S.C. 154(b) by 791 days.

(21) Appl. No.: 10/589,033

(22) PCT Filed: Jan. 24, 2005

(86) PCT No.: PCT/EP2005/000792

§ 371 (c)(1),
(2), (4) Date: Jun. 19, 2007

(87) PCT Pub. No.: WO2005/075270

PCT Pub. Date: Aug. 18, 2005

(65) Prior Publication Data

US 2008/0039288 A1    Feb. 14, 2008

(30) Foreign Application Priority Data

Feb. 9, 2004  (DE) .................. 10 2004 006 374

(51) Int. Cl.
*B60W 10/04* (2006.01)
*B60W 10/18* (2006.01)
(52) U.S. Cl. ............................................ 477/185
(58) Field of Classification Search ............. 477/189, 477/190, 191, 195, 197, 198, 185
See application file for complete search history.

(56) References Cited

U.S. PATENT DOCUMENTS

| | | | |
|---|---|---|---|
| 5,670,831 A | 9/1997 | Georgiades | |
| 5,975,648 A | 11/1999 | Rump | |
| 6,702,405 B1 | 3/2004 | Balz et al. | |
| 2002/0023809 A1* | 2/2002 | Ehrmaier et al. | ............ 188/110 |

FOREIGN PATENT DOCUMENTS

| | | |
|---|---|---|
| DE | 41 29 919 | 3/1993 |
| DE | 196 19 641 | 8/1997 |
| DE | 198 38 886 | 10/1999 |
| DE | 100 61 007 | 6/2002 |
| DE | 102 11 462 | 7/2003 |
| JP | 58-186963 | 12/1983 |
| WO | WO 90/15743 | 12/1990 |

OTHER PUBLICATIONS

International Search Report, PCT International Patent Application No. PCT/EP2005/000792, dated Mar. 16, 2005.
International Preliminary Report Patentability, PCT Application No. PCT/2005/000792, dated Oct. 3, 2006. (English-language trasletion).

* cited by examiner

*Primary Examiner*—Sherry L Estremsky
*Assistant Examiner*—Edwin A. Young
(74) *Attorney, Agent, or Firm*—Kenyon & Kenyon LLP

(57) ABSTRACT

A method and a device are for activating an electric parking brake of a motor vehicle, e.g., a road motor vehicle. Initiation of a connection process is recognized for disconnecting a drive motor of the vehicle when the vehicle is parked. The electric parking brake is initially activated after the initiation of the parking step, and the drive motor is disconnected thereafter. As a result, the drive motor may be used to activate the parking brake.

12 Claims, 1 Drawing Sheet

METHOD AND DEVICE FOR ACTIVATING AN ELECTRIC PARKING BRAKE

FIELD OF THE INVENTION

The present invention relates to a method and a device for activating an electric parking brake of a motor vehicle, e.g., a road motor vehicle.

BACKGROUND INFORMATION

German Published Patent Application No. 198 38 886 describes an electric immobilizing brake or parking brake for a vehicle. The driver of the motor vehicle activates the electric parking brake via a push-button switch, for example. The parking brake provides that the vehicle is no longer able to move in the stopped or parked state. To achieve the immobilizing braking effect, it is possible, for example, to control the parking brake's wheel brakes arranged on the wheels of the motor vehicle by electromotor/transmission units designed to self-lock. This provides the effect of a conventional mechanical immobilization brake.

Activation of the electric parking brake requires electric energy, which can be drawn from the vehicle electrical system. When turning off or parking the motor vehicle, in particular on inclines, it is important that the electrical energy is available at all times. Otherwise it may happen that the vehicle is not reliably protected from unintended rolling. Dangerous situations may occur as a result, in particular in motor vehicles in which the mechanical power of the drive motor is additionally utilized to activate a service brake of the motor vehicle. If after shut-down of the drive motor the electrical energy in such vehicles is no longer sufficient to restart the drive motor, the vehicle is no longer fully controllable.

To avoid such situations, German Published Patent Application No. 198 38 886 describes to provide an auxiliary battery whose energy, as a minimum, is sufficient to activate the parking brake. Disadvantageous in an auxiliary battery provided in addition to the battery of the vehicle electrical system is the effort and expense it entails with regard to construction and production. Also, it is possible once again that the auxiliary battery will no longer have sufficient energy or is unable to store sufficient energy.

SUMMARY

Example embodiments of the present invention provide a method and a device for activating an electric parking brake of a motor vehicle, which may allow reliable stopping of the motor vehicle during parking.

According to an example embodiment of the present invention, a drive motor of the motor vehicle is to be turned off only after activation of the electric parking brake when parking the motor vehicle. In this manner, the mechanical energy of the drive motor may still be used for the activation, e.g., by the drive motor driving a generator and using for the activation the electrical energy produced by the generator. This allows the motor vehicle to be parked securely even when the energy store of the vehicle electrical system is low.

It may be detected that the shut-down operation is initiated, and the parking brake is activated subsequently. For example, it is possible to monitor whether the vehicle driver gives a signal for turning off an ignition system of an internal combustion engine. The turn-off is implemented only when the parking brake is activated.

For example, when a generator mechanically coupled to the drive motor is used to generate electrical energy, no modifications with respect to conventional electrical wiring systems of motor vehicles may be required. For example, no auxiliary battery may be necessary to activate the electric parking brake. Instead, appropriate arrangement of the control devices in the motor vehicle may be sufficient.

A device for activating the electric parking brake has, for example, an activation device for generating an activation signal that activates the electric parking brake. The activation device may, for example, generate the activation signal automatically, e.g., when the motor vehicle is being parked. To this end, a detection device for detecting the initiation of the parking operation is provided. In an example embodiment of the detection device, it detects the initiation of a shut-down operation for turning the drive motor off. If a conventional ignition lock with ignition key is provided, for example, the vehicle driver turns the ignition key to the "off" position in order to shut down the drive motor. However, the vehicle driver may also give a signal for shutting down the drive motor in some other manner, for example, by activating an electric push-button switch.

Furthermore, an engine-control device for controlling the shut-down operation is provided in the device. The detection device is connected to the engine-control device and to the activation device. The activation device and the engine control device are arranged and combined with each other such that, once of the shut-down operation has been initiated, the activation signal activates the electric parking brake first, the operation of the drive motor being maintained in the meantime, and the drive motor being turned off only afterwards.

It is possible to provide a higher-level control device, which controls the sequence of actions of the engine-control device and the activation device. This higher-level control device may also assume additional tasks such as detecting the initiation of the shut-down operation (i.e., it includes the detection device) and/or additional determinations and/or detections, which will be addressed in more detail below and on the basis of whose results a decision is made as to whether the drive motor will be utilized to activate the electric parking brake.

The engine-control device, the activation device and/or the detection device may also be integrated in a shared control device. This is encompassed in that the devices are interconnected.

Although it is possible to shut down the drive motor during each parking operation only after the parking brake has been activated, it may be provided that this be made dependent on one or more of the following criteria:

The operating state of an electrical energy supply of the motor vehicle. For example, a loading state of an energy store of the energy supply is ascertained and/or it is determined whether the energy store is defective. To this end, an operating-state device for determining the operating state may be provided in the aforementioned device, the operating-state device being coupled to the engine-control device.

An angle of inclination of the motor vehicle. This criterion is considered satisfied, for example, when the amount of the angle of inclination is greater than or equal to 80. With respect to the angle of inclination, it may be differentiated between the roll angle (measured in a plane transversely to the vehicle's longitudinal axis) and the pitch angle (measured in a plane that includes the vehicle's longitudinal axis). For example, solely the pitch angle is considered in the decision as to whether the method will be implemented. A detection device for ascertaining the angle of inclination may be provided in the aforementioned device, the detection device being coupled to the engine-control device.

Standstill of the motor vehicle. For example, it is determined whether all wheels of the motor vehicle are stopped. Signals from rpm sensors, for example, may be analyzed for this purpose. Rpm sensors may normally be present in motor vehicles anyway, for example, in connection with an anti-lock braking system.

The automatic activation of the parking brake with a subsequent shut-down of the drive motor may thus be made dependent on whether the operating state of the electric energy supply requires it, whether the motor vehicle is to be parked at an angle of inclination that is greater than a minimum angle of inclination, and/or whether the vehicle is at a standstill. In this manner, safety functions are performed only when required, and the functionality is not considered as distracting. After parking on level terrain, for example, the motor vehicle is thus able to be moved without renewed startup of the drive motor.

The activation of the electric parking brake may be implemented in a variety of manners. For example, the operation of the drive motor may be maintained for a period of time having a defined length and starting with the initiation of the shut-down operation and/or the receipt of a corresponding shut-down signal for turning the drive motor off. As an alternative, it is possible, for example, to first determine whether the parking brake was activated and only then to generate a signal that effects the shut-down of the drive motor. With the first option, it may be sufficient to maintain the operation of the drive motor over a period of time that lasts at least one second.

Example embodiments of the present invention are described in more detail below with reference to the appended Figures.

DETAILED DESCRIPTION

Figure 1:
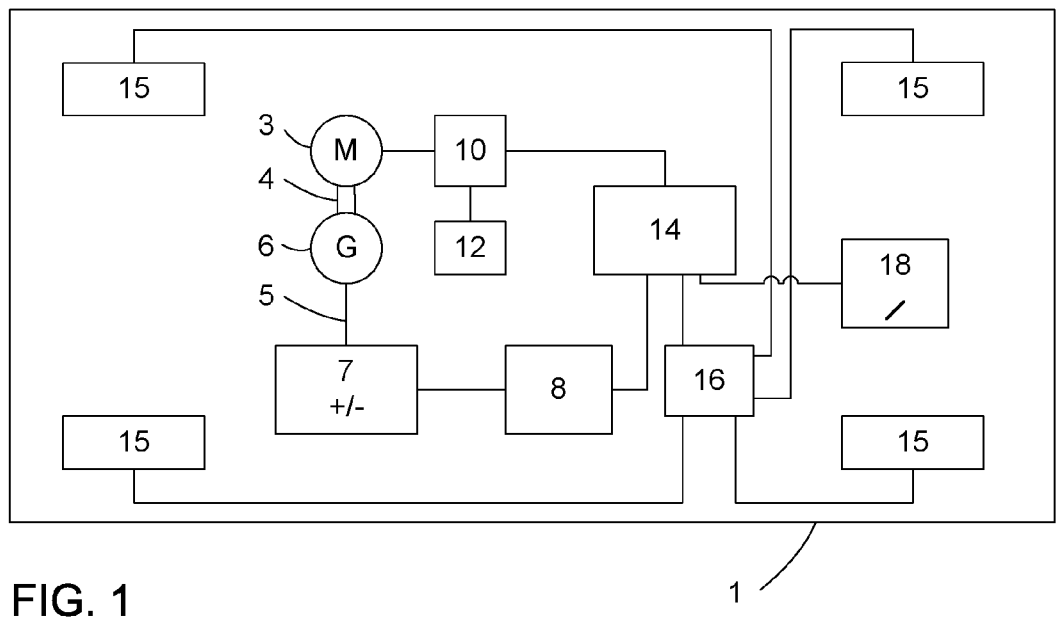
FIG. 1 is a schematic representation of a system in a road motor vehicle having an electrical energy supply and including control devices that allow an implementation of a method according to example embodiments of the present invention.

Motor vehicle 1, schematically illustrated in FIG. 1 within a rectangular frame, has a drive motor 3, which during its operation drives a generator 6 via a mechanical coupling 4. The electrical energy generated by generator 6 is fed into a vehicle electrical system 5, which has at least one energy store for storing electrical energy, e.g., a conventional vehicle battery. Vehicle electrical system 5 is connected to a battery state device 8 (such as a control device for a vehicle electrical system), which is able to determine a charge state of energy store 7, for example. A corresponding result of this determination is transmitted to a control device 14 of an electric parking brake (EPB control device in the following text), continuously and/or as required.

Drive motor 3 may be an internal combustion engine, which may be turned off and on by activating an ignition switch 12. Ignition switch 12 is connected to an engine control device 10, which is connected to drive motor 3. In this manner, engine control device 10 is able to actually take the switching state of ignition switch 12 into account, but not implement a corresponding action directly (i.e., without a time delay). Instead, engine control device 10 may maintain the operation of drive motor 3 as a function of signals it receives from EPB control device 14, notwithstanding that the ignition switch is turned to the "off" position. It is also possible that engine control device 10 decides on its own whether and/or for how long the operation of drive motor 3 will be maintained.

A separate rpm sensor 15 is illustrated in the region of the four corners of the rectangular frame in FIG. 1, which is assigned to one of the four wheels of motor vehicle 1 in each instance. In this manner, a movement device 16 (which has a wheel speed evaluator, for example) is able to record the rotational wheel speeds of all four wheels. Movement device 16, for example, is able to determine whether all four wheels—and thus vehicle 1—are/is at a standstill. Movement device 16 is connected to EPB control device 14, so that EPB control device 14 receives a signal from movement device 16, continually and/or as required, and it is possible to determine from the signal whether the vehicle is stopped.

Furthermore, a detection device 18 is provided, which ascertains an angle of inclination of motor vehicle 1, e.g., the amount of a pitch angle. A corresponding signal is transmitted to EPB control device 14 on a continuous basis and/or as required.

Figure 2:
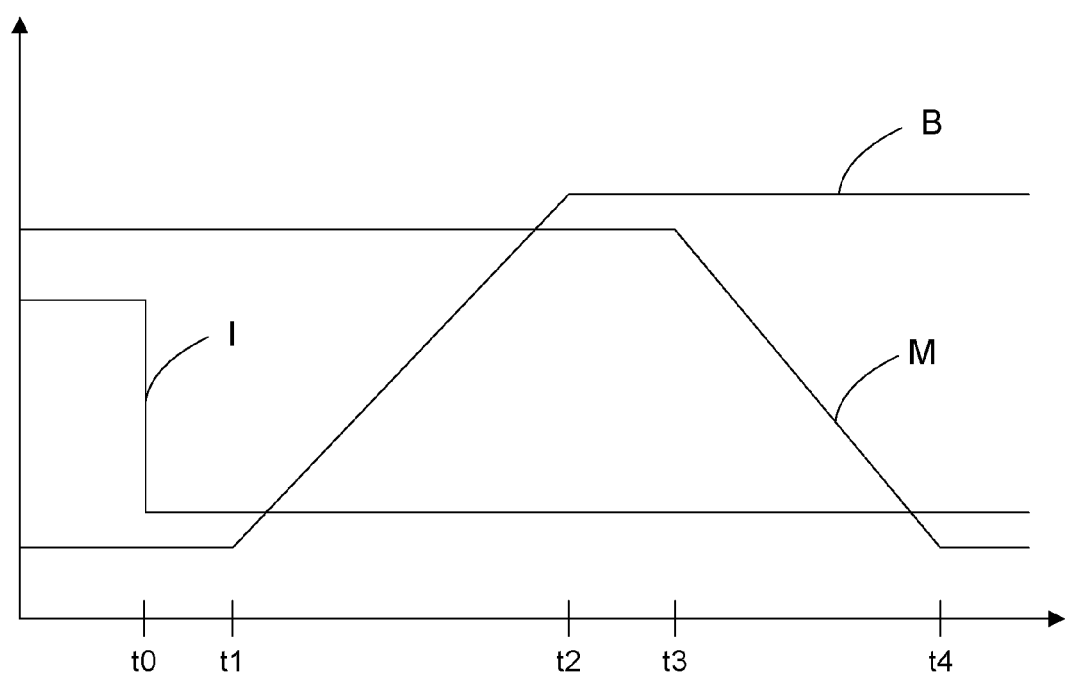
FIG. 2 is a time diagram in simplified form, which illustrates the chronology of different actions and events in the execution of the method according to example embodiments of the present invention.

An example of an operation of the system illustrated in FIG. 1 is explained in greater detail with reference to FIG. 2.

First of all, it is assumed that energy store 7 of vehicle electrical system 5 is in a fully functional operating state, i.e., in particular is sufficiently charged to activate an electric parking brake. The activation, with the aid of electrical energy from the vehicle electrical system, may be carried out as described in German Published Patent Application No. 198 38 886, for example, whereas the generation of a corresponding activation signal is implemented in the manner hereof.

If ignition switch 12 is switched to "off", EPB control device 14 determines from the signals received from operating state device 8 that energy store 7 carries a sufficient charge. By transmitting a corresponding control signal to engine control device 10 (or by non-transmission of a control signal), engine control device 10 determines that operation of drive motor 3 is able to be terminated immediately, and turns drive motor 3 off.

Accordingly, drive motor 3 is also shut down immediately once ignition switch 12 has been switched off if detection device 18 determines that a predefined amount of an angle of inclination (such as 50 or 80, for example) is not exceeded.

If ignition switch 12 is switched off and motor vehicle 1 is not at a standstill, EPB control device 14 may output a corresponding signal to engine control device 10, so that the operation of drive motor 3 will not be terminated (and the electric parking brake will not be activated either) until vehicle 1 is stopped. The method may be implemented in the manner described below as soon as standstill has been reached.

If vehicle electrical system control device 8 detects that the operating state of energy store 7 does not allow reliable activation of the electric parking brake (for example, that the energy store is defective), if detection device 18 detects that motor vehicle 1 is on steep terrain (the amount of the pitch angle is greater than 50 or 80, for example), and if vehicle 1 is stopped, the following actions will be carried out:

When turning ignition switch 12 off at instant t0 (illustrated in FIG. 2 as abrupt decrease in signal I from a high level to a low level), EPB control device 14 detects the described state of motor vehicle 1 and outputs a signal to engine control device 10, which induces it not yet to terminate the operation of drive motor 3. This is illustrated in FIG. 2 by a horizontally extending line M, which continues past instant t0 at a high level. At the same time or subsequently, EPB control device 14 outputs a signal to an activation device for activation of the electric parking brake, so that the electric parking brake is activated beginning with instant t1 and is fully activated at instant t2. This is illustrated in FIG. 2 by a line B, which rises from instant t1 to instant t2. The electric parking brake then stays in the activated (engaged) state. A time span that corresponds to the interval between instant t0 and instant t3 at which engine control device 10 initiates the switch-off of drive motor 3 is predefined in engine control device 10 (for example, programmed). As indicated in FIG. 2 by a descending line M between instant t3 and instant t4, drive motor 3 is turned off only after the interval has elapsed. The interval may be selected to be greater than the maximally possible duration of the activation of the electric parking brake, plus possible intervals that are required to carry out the described control measures. For example, as illustrated in FIG. 2, a short delay occurs until the activation of the electric parking brake begins at instant t1 after ignition switch 12 has been turned off.

As an alternative, the activation device outputs a success signal to EPB control device 14 once the electric parking brake is fully activated.

Variants and further developments of the method and the device hereof are possible. For example, a deactivation device may be provided, which is able to prevent the execution of the method and/or which is able to deactivate (disengage) the already activated electric parking brake without renewed starting of the drive motor. In this manner, it is possible, for example, to tow the motor vehicle even on steep terrain. The deactivation device is directly connected to EPB control device 14, for example, which controls the operation of the electric parking brake accordingly.

What is claimed is:

1. A method for activating an electric parking brake of a motor vehicle, comprising:
   detecting an initiation of a shut-down operation for turning off a drive motor of the motor vehicle;
   activating the electric parking brake after initiation of the shut-down operation, and
   turning off the drive motor only after completion of activation of the electric parking brake.

2. The method according to claim 1, wherein the motor vehicle is arranged as a road motor vehicle.

3. The method according to claim 1, further comprising determining whether the vehicle is stopped;
   wherein the electric parking brake is activated in the activating step only when the motor vehicle is stopped.

4. A method for activating an electric parking brake of a motor vehicle, comprising:
   detecting an initiation of a shut-down operation for turning off a drive motor of the motor vehicle;
   activating the electric parking brake after initiation of the shut-down operation;
   after the activating step, turning off the drive motor;
   ascertaining an operating state of an electric energy supply for activating the electric parking brake; and
   determining as a function of the operating state as to whether the drive motor will be used to activate the electric parking brake.

5. The method according to claim 4, wherein the operating state includes a charge state of an energy store of the electric energy supply.

6. A method for activating an electric parking brake of a motor vehicle, comprising:
   detecting an initiation of a shut-down operation for turning off a drive motor of the motor vehicle;
   activating the electric parking brake after initiation of the shut-down operation;
   after the activating step, turning off the drive motor;
   ascertaining an angle of inclination of the motor vehicle; and
   determining as a function of an amount of the angle of inclination as to whether the drive motor will be used to activate the electric parking brake.

7. A method for activating an electric parking brake of a motor vehicle, comprising:
   detecting an initiation of a shut-down operation for turning off a drive motor of the motor vehicle;
   activating the electric parking brake after initiation of the shut-down operation;
   after the activating step, turning off the drive motor; and
   maintaining operation of the drive motor during an interval having a defined length and beginning with at least one of (a) the initiation of the shut-down operation and (b) a receipt of a corresponding shut-down signal.

8. A device for activating an electric parking brake of a motor vehicle, comprising:
   an activation device adapted to generate an activation signal by which the electric parking brake is activatable;
   an engine control device adapted to control a shut-down operation by which a drive motor of the motor vehicle is turned off; and
   a detection device adapted to detect an initiation of the shut-down operation to turn off the drive motor, the detection device connected to the activation device and the engine control device;
   wherein the activation device and the engine control device are combined and adapted to, after initiation of the shut-down operation, first activate the electric parking brake by the activation signal while operation of the drive motor is maintained, and to turn off the drive motor only after completion of activation of the electric parking brake.

9. The device according to claim 8, wherein the motor vehicle is arranged as a road motor vehicle.

10. The device according to claim 8, further comprising a movement device adapted to determine whether the motor vehicle is stopped, the movement device coupled to the engine control device to maintain the operation of the drive motor as a function of a standstill of the motor vehicle until activation of the electric parking brake.

11. A device for activating an electric parking brake of a motor vehicle, comprising:
   an activation device adapted to generate an activation signal by which the electric parking brake is activatable;
   an engine control device adapted to control a shut-down operation by which a drive motor of the motor vehicle is turned off;
   a detection device adapted to detect an initiation of the shut-down operation to turn off the drive motor, the detection device connected to the activation device and the engine control device; and
   an operating state device adapted to determine an operating state of an electric energy supply for an activation of the electric parking brake, the operating state device coupled to the engine control device to maintain operation of the drive motor as a function of the operating state until activation of the electric parking brake;
   wherein the activation device and the engine control device are combined and adapted to, after initiation of the shut-down operation, first activate the electric parking brake by the activation signal while the operation of the drive motor is maintained, and to turn off the drive motor only afterward.

12. A device for activating an electric parking brake of a motor vehicle, comprising:
- an activation device adapted to generate an activation signal by which the electric parking brake is activatable;
- an engine control device adapted to control a shut-down operation by which a drive motor of the motor vehicle is turned off;
- a detection device adapted to detect an initiation of the shut-down operation to turn off the drive motor, the detection device connected to the activation device and the engine control device; and
- a second detection device adapted to detect an angle of inclination of the motor vehicle, the second detection device coupled to the engine control device to maintain operation of the drive motor as a function of a magnitude of the angle of inclination until activation of the electric parking brake;
- wherein the activation device and the engine control device are combined and adapted to, after initiation of the shut-down operation, first activate the electric parking brake by the activation signal while the operation of the drive motor is maintained, and to turn off the drive motor only afterward.

* * * * *